United States Patent
Makris et al.

(10) Patent No.: US 7,155,714 B2
(45) Date of Patent: Dec. 26, 2006

(54) NETWORK DISTRIBUTED PRODUCT MANAGER SYSTEM

(75) Inventors: Stefanos Michail Makris, Novato, CA (US); Sankarganesh Gopalakrishnan, Novato, CA (US); Elango Ganfsan, Richmond, CA (US); Eng Guan Chan, Novato, CA (US)

(73) Assignee: Autodesk, Inc., San Rafael, CA (US)

( * ) Notice: Subject to any disclaimer, the term of this patent is extended or adjusted under 35 U.S.C. 154(b) by 586 days.

(21) Appl. No.: 10/171,331

(22) Filed: Jun. 12, 2002

(65) Prior Publication Data

US 2003/0236772 A1 Dec. 25, 2003

(51) Int. Cl.
G06F 9/445 (2006.01)

(52) U.S. Cl. .................... 717/176; 717/174

(58) Field of Classification Search ............ 707/3–203; 702/186; 718/100; 709/318; 705/29, 129; 717/120–143; 713/1; 716/3
See application file for complete search history.

(56) References Cited

U.S. PATENT DOCUMENTS

| | | | | |
|---|---|---|---|---|
| 5,930,503 A | * | 7/1999 | Drees | ............................ 713/1 |
| 6,134,548 A | * | 10/2000 | Gottsman et al. | ............... 707/5 |
| 6,202,062 B1 | * | 3/2001 | Cameron et al. | ............... 707/3 |
| 6,532,481 B1 | * | 3/2003 | Fassett, Jr. | ................... 707/203 |
| 6,536,017 B1 | * | 3/2003 | Sanders | ......................... 716/3 |
| 6,782,350 B1 | * | 8/2004 | Burnley et al. | ............. 702/186 |
| 6,868,540 B1 | * | 3/2005 | Hunsinger et al. | .......... 718/100 |
| 2001/0053980 A1 | * | 12/2001 | Suliman et al. | ................ 705/1 |
| 2002/0016750 A1 | * | 2/2002 | Attia | ........................... 705/26 |
| 2002/0116301 A1 | * | 8/2002 | Chapman et al. | ............. 705/29 |
| 2002/0165997 A1 | * | 11/2002 | Hunsinger et al. | .......... 709/318 |
| 2002/0188622 A1 | * | 12/2002 | Wallen et al. | ........... 707/104.1 |
| 2003/0140034 A1 | * | 7/2003 | Probst et al. | ................... 707/3 |

* cited by examiner

*Primary Examiner*—Kakali Chaki
*Assistant Examiner*—Mark P. Francis
(74) *Attorney, Agent, or Firm*—Gates & Cooper LLP (57) ABSTRACT

A method, apparatus, and article of manufacture for inventorying software products. One or more search definitions are created specifying the software products, as well as one or more network domains and individual computers, to be searched. The search is performed using an XML (eXtensible Markup Language) parser file to extract data on the specified software products from the registries of the specified network domains and individual computers. A report listing of the software products installed on the specified network domains and individual computers is compiled from this data. The report listing can be saved for later use in an inventory database.

24 Claims, 5 Drawing Sheets

NETWORK DISTRIBUTED PRODUCT MANAGER SYSTEM

BACKGROUND OF THE INVENTION

1. Field of the Invention

The present invention generally relates to a system for inventorying computer programs, and, in particular, to a network distributed product manager system.

2. Description of the Related Art

Inventorying software products across a network has traditionally been a manually intensive task. In the absence of dedicated tools to assist them in the process, system managers often face a tedious and time-consuming task of computer-by-computer visits to determine what software products have been installed on a particular computer. Even in cases where system managers keep accurate and up-to-date records of the installed software products, users often install software products themselves, thus requiring the system manager to visit to each computer to determine a full inventory of the software products installed thereon.

Thus, there is a need in the art for solutions to these problems. Specifically, there is a need for search and deployment tools that identify software products installed on various computers in a network.

SUMMARY OF THE INVENTION

To address the requirements described above, the present invention discloses a method, apparatus, and article of manufacture for inventorying software products. One or more search definitions are created specifying the software products, as well as one or more network domains and individual computers, to be searched. The search is performed using an XML (eXtensible Markup Language) parser file to extract data on the specified software products from the registries of the specified network domains and individual computers. A report listing of the software products installed on the specified network domains and individual computers is compiled from this data. The report listing can be saved for later use in an inventory database.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
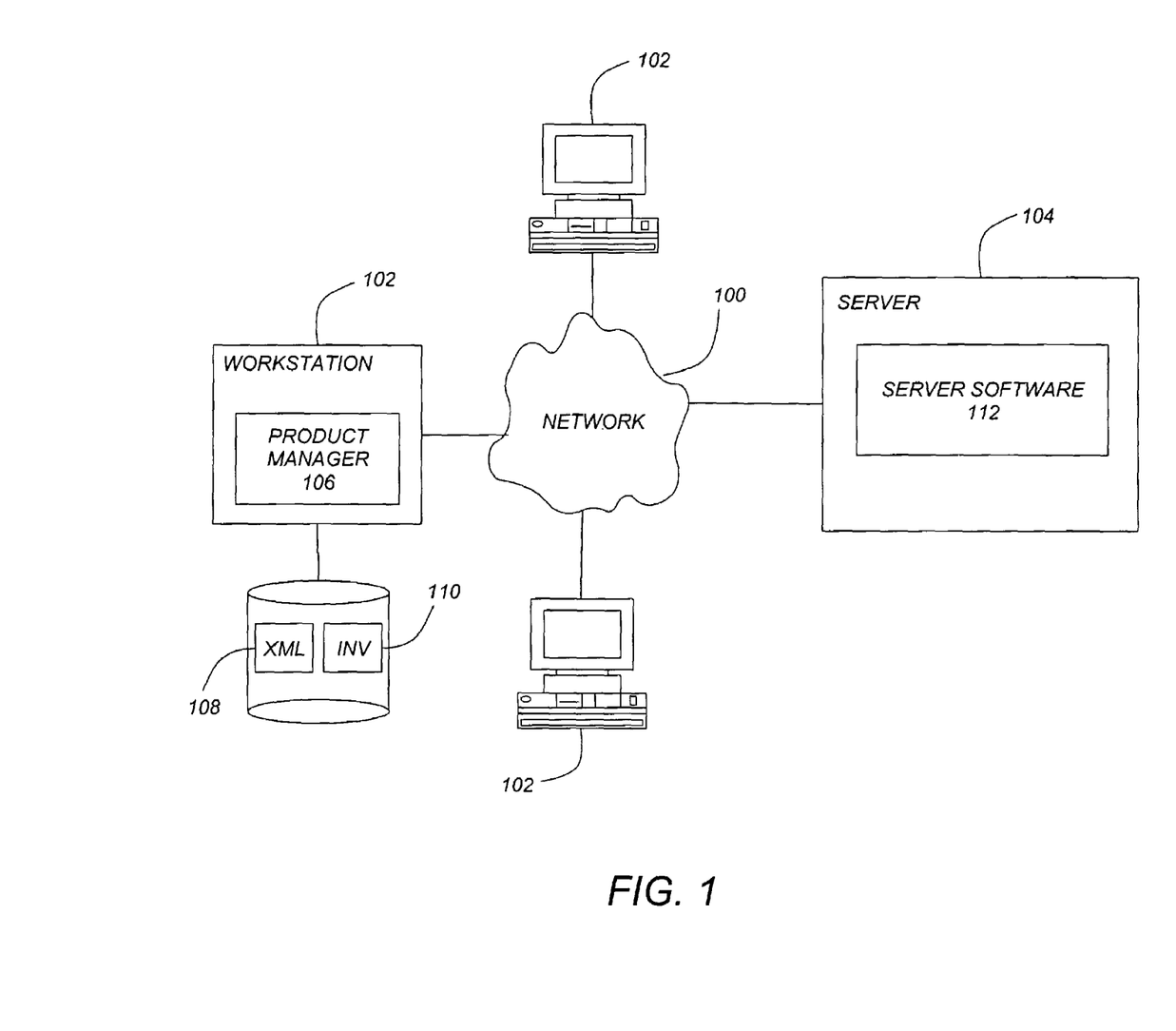
FIG. 1 schematically illustrates an exemplary hardware and software environment used in the preferred embodiment of the present invention.

FIG. 1 schematically illustrates an exemplary hardware and software environment used in the preferred embodiment of the present invention. The present invention is usually implemented using a network 100 to connect one or more workstations 102 to one or more server computers 104. A typical combination of resources may include workstations 102 that comprise personal computers, network computers, etc., and server computers 104 that comprise personal computers, network computers, workstations, minicomputers, mainframes, etc. The network 100 coupling these computers 102 and 104 may comprise a LAN, WAN, Internet, etc.

Generally, the present invention is implemented using one or more computer programs, files and/or databases that are executed and/or interpreted by the workstations 102. In the exemplary embodiment of FIG. 1, these computer programs and databases include a Product Manager 106 executed by one or more of the workstations 102, and an XML parser file 108 and inventory database 110 stored on or accessible to the workstation 102. In addition, the environment often includes one or more server programs 112 executed by the server computer 104.

Each of the computer programs and/or databases comprise instructions and data which, when read, interpreted, and executed by their respective computers, cause the computers to perform the steps necessary to execute the steps or elements of the present invention. The computer programs and databases are usually embodied in or readable from a computer-readable device, medium, or carrier, e.g., a local or remote data storage device or memory device coupled to the computer directly or coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs and/or databases accessible from any device, carrier, or media.

Of course, those skilled in the art will recognize that the exemplary environment illustrated in FIG. 1 is not intended to limit the present invention. Indeed, those skilled in the art will recognize that other alternative environments may be used without departing from the scope of the present invention.

User Interface of the Product Manager

Figure 2:
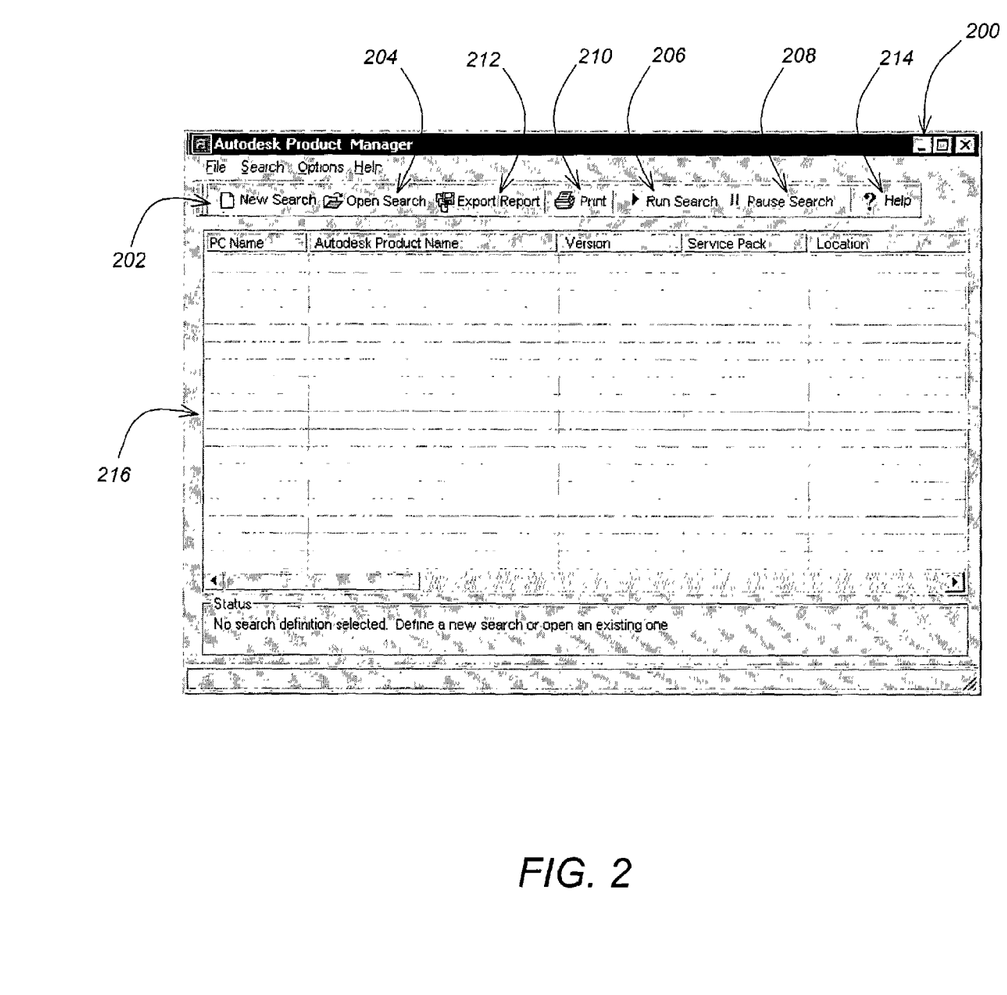
FIG. 2 illustrates a dialog of an exemplary main user interface for the Product Manager according to the preferred embodiment of the present invention.

FIG. 2 illustrates a dialog 200 of an exemplary main user interface for the Product Manager 106 according to the preferred embodiment of the present invention.

Figure 3:
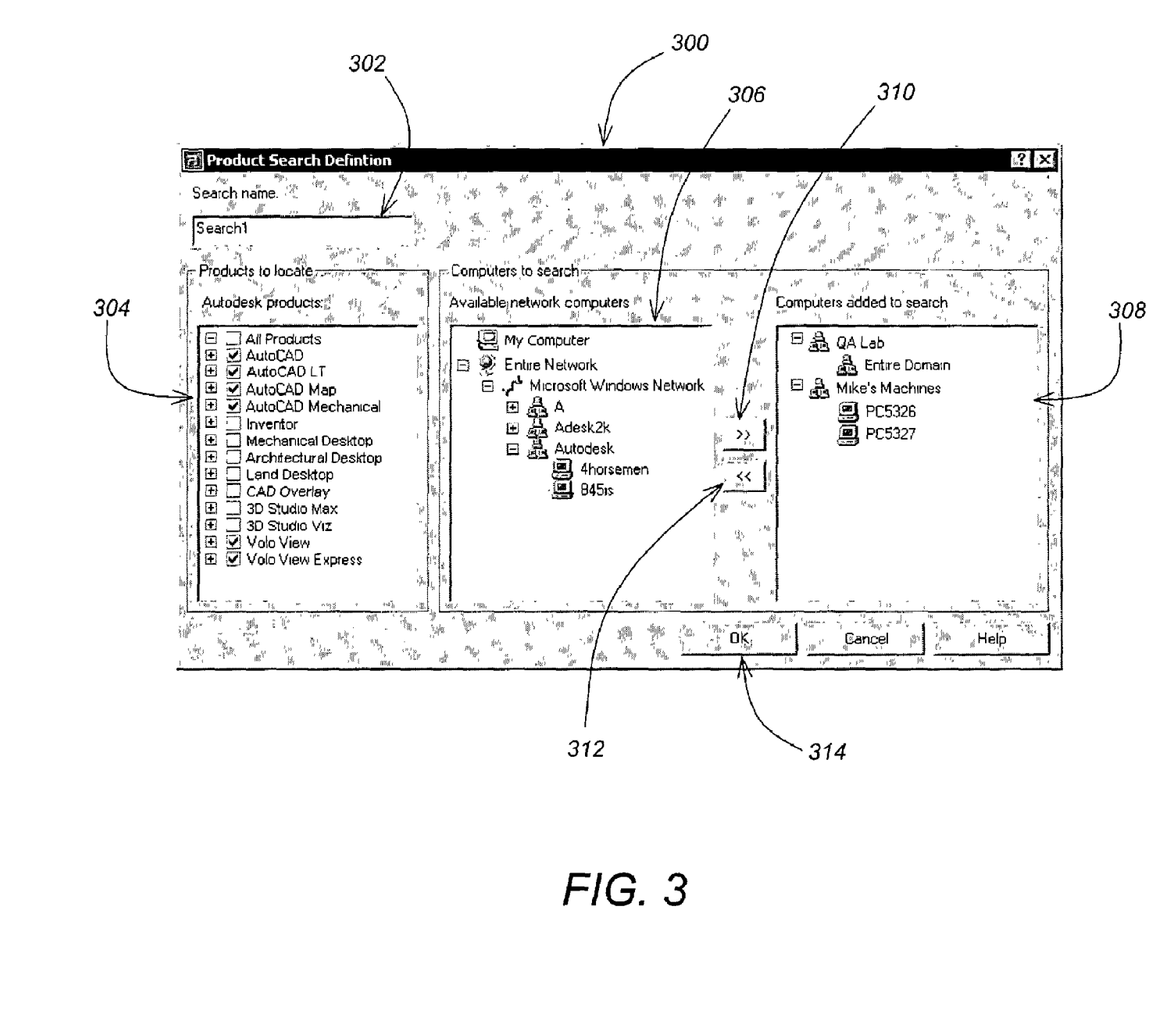
FIG. 3 illustrates a dialog of an exemplary search definition user interface for the Product Manager according to the preferred embodiment of the present invention.

Upon initiating the Product Manager 106, the system manager can first create a new search definition (using the New Search button 202) or select an existing search definition (using the Open Search button 204) to use as a basis for creating a report of software product installations. Thereafter, FIG. 3 is displayed, which illustrates a dialog 300 of an exemplary search definition user interface for the Product Manager 106 according to the preferred embodiment of the present invention.

Searches must have a unique name, which are specified in field 302. The system manager can create as many search definitions as needed and save them for later access and execution.

List box 304 allows the system manager to specify the software products to look for during the search. The software products to search for are listed in groups, and the system manager can select one or more groups or all groups.

By default, the "All Products" item is selected in the list box 304, indicating that when a search is launched, it will be performed for all products. If the system manager selects individual products in the list box 304, the "All Products" item is automatically unchecked. If the system manager checks all available individual products, then the "All Products" item is automatically checked and the individual products are automatically unchecked.

Each of these products in list box 304 (excepting "All Products") is expandable, revealing a complete list of all searchable versions for a software product represented by a particular top-level node. Each of the sub items is, in turn, selectable. This gives system managers a large degree of control over the products that they search for, and can be used to optimize searches, particularly in organizations where only one or two releases of a relatively small number of software products are known to be present.

List boxes 306 and 308 allow the system manager to specify the network domains and individual computers to examine in the search. For example, list box 306 comprises a hierarchical tree view that lists network domains and individual computers that are available ("Available network computers"), and list box 308 comprises a hierarchical tree view that lists network domains and individual computers to be searched ("Computers added to search"). Horizontal and vertical scroll bars are added to the list boxes if needed, and a tool-tip is displayed as the mouse hovers individual nodes if the text is too long to display in the list boxes.

At the top-most level of list box 306 are two nodes: "My Computer" and "Entire Network". The "My Computer" node is a shortcut that points to the current system manager's system. The "Entire Network" node lists available network domains; and individual computers located within these domains.

System managers navigate to a network domain or individual computer in list box 306 that they would like to add to their search, and then choose the ">>" button 310 to add it to the list box 308. Double-clicking a network domain or individual computer in list box 306 also causes it to be added to the list box 308. Items can be removed by right-clicking them from the list box 308 and choosing the "<<" button 312.

Computers that are added individually to the search definition show up in the "Computers Added to Search" list box 308 under their respective domains. This makes it easier for system managers to be able to reference and locate individual computers within this list. If an entire network domain is added to the list box 308, the name of the network domain appears as the top-most node, with a sub-node reading "Entire Domain". This serves to differentiate computers in the list box 308 that have been added individually or as entire network domains. It should be noted that if an entire network domain is added to a search, only those computers that are physically logged onto the network domain at the time the search is run will be searched.

Suppose, for example, that the system manager desires to search a network domain that contains 100 computers. At the time the search is created and the network domain is added to the search, only 98 of these computers are logged on. If, after creating the search definition, the system manager immediately runs the search, only those 98 computers will be interrogated. If, on a subsequent run, all 100 computers are logged on, then all 100 computers will be interrogated.

In other words, adding a network domain to a search definition adds a reference to the entire network domain, but does not perform any sort of validation to determine if all computers registered with the domain are currently logged on. It is important to ensure that searches are run at times when it is expected that the greatest percentage of computers will be logged on and available. If the system manager wants a greater degree of explicit control over the computers that are searched (for example, if they have a master list of computers and want to insure that each are interrogated), they should explicitly add individual computers to their saved searches, rather than specifying entire domains.

After the desired software products, network domains and individual computers have been selected, the system manager clicks on the "OK" button 314 to save the search definition. Thereafter, the dialog 200 of the exemplary main user interface for the Product Manager found in FIG. 2 is once again displayed.

Once a search definition has been created or selected, the system manager can run the search (using the Run Search button 206), pause an executing search (using the Pause Search button 208), print the results of a search (using the Print button 210), export the results of a search (using the Export Search button 212) or request further help (using the Help button 214).

If the Run Search button 206 is selected, then the Product Manager 106 performs the search using the XML parser file 108 to extract data on the specified software products from the registries of the network domains and individual computers previously defined in the "Computers Added to Search" list box 308 for the search definition in FIG. 3.

As the search is processed, and the network domains and individual computers are interrogated, the results are displayed as a summary report in a grid control 216 in the Product Manager 106. If more than one software product is found installed on a computer, the computer is listed in a new row in the grid control 216 and the information is provided for the additional software product.

The Product Manager 106 reports the following information for each software product found installed on a computer.

| Field Name | Field Description |
| --- | --- |
| PC Name | Displays the name of the computer currently being searched. By default, computers are searched in the order they appear in the search definition. If multiple software products are installed on an individual computer, the computer name will appear in the PC Name field on multiple lines. The PC Name field is preceded by an icon that indicates the reachable status of this individual computer. If the computer was successfully interrogated, the following icon precedes the PC name: ▢. If the computer was not reachable, the following icon precedes the PC name: ▢. |
| Product Name | Displays the name of a software product found on a particular computer. If no products were found, this field displays the value of "None". |
| Version | Displays the version or release number/name of the current product. If no installed products are found for the current system this field remains blank. |

-continued

| Field Name | Field Description |
| --- | --- |
| Service Pack | Displays the name of the service pack (if any) installed for the current software product. |
| Location | Displays the location of a specific software product installation. If no installed products are found for the current system, this field remains blank. |

Other information available as columns (not shown) in the grid control 216 include:

| | |
| --- | --- |
| Serial Number | Displays the serial number of a specific software product installation. If no installed products are found for the current system, this field remains blank. |
| User Name | Displays a concatenation of the first and last name fields (if specified) from the product's personalization info. |
| Organization | Displays the name of the system manager's company (if specified) from the product's personalization info |
| Dealer Name | Displays the name of the system manager's dealer (if specified) from the product's personalization info. |
| Dealer Phone | Displays the phone number of the system manager's dealer (if specified) from the product's personalization info. |
| Extension Type | Displays the type of installed extension, if any found for the current software product. Valid values are Add-on, Extension, Enabler, etc. |
| Installation Type | Displays the installation type of the current software product: standalone, network, etc. |
| Query Status | The resolution status of interrogating the current networked computer. Query status can be "OK" (computer successfully reached), "Unable to access computer" (generic placeholder for a variety of conditions, including computer logged off or otherwise unavailable), and "Access to the computer is denied" (the system manager is not authorized to access the computer in question). |
| Query Date | The date and time an individual computer was searched on. |

Note that the system manager can control which data columns are displayed in the grid control 216. Moreover, the data columns can also be reordered.

The system manager can run a defined search any number of times. Each time, the system manager can either generate a new report or add to the results from an earlier search.

The Options menu allows parameters (not shown) to be set that control the operation of the search. For example, the system manager can control how many times the Product Manager 106 attempts to search computers that are unavailable. In another example, system managers can choose to run a search repeatedly until all specified computers are contacted. Other examples may include permitting the search to be run for a specified number of times, or for a discrete temporal duration.

A mechanism (Pause Search button 208) is also provided so the system manager can pause and resume an in-progress search. If a search is paused while it is running and then run it again, the new results are added to the results from the original search. To start the search from the beginning again, the results should be cleared from the grid control 216.

Once the search is completed, the system manager can print a report from the Product Manager 106 (using the Print button 210), or export the results to an inventory file 110 or a spreadsheet or database program (using the Export Report button 212).

Parser Function of the Product Manager

The Product Manager 106 includes an XML parser function that acts as an interpreter and uses the logic specified by the XML parser file 108 to parse, navigate and evaluate patterns and structures on the Windows™ registry of the computers being searched. The logic described by the XML parser file 108 provides the necessary commands and conditional checks, as well as the rules for structured data extraction from the Windows™ registry.

The XML parser file 108 includes a set of scripting directives or commands organized in a hierarchical manner as part of a tree structure of the XML parser file 108. The XML parser function of the Product Manager 106 evaluates the scripting directives for each registry accessed from the specified network domains and individual computers.

Following is a brief description of the XML tags and their semantics that form the basis of the script directives found in the XML parser file 108. In this discussion, "nodes" comprise paired XML tags, and "child nodes" are paired XML tags that comprise subordinate nodes within other superordinate nodes. The subordinate/superordinate relationships among paired tags provide the hierarchical structure of the XML parser file 108.

Within the XML parser file 108, an<?xml version="1.0"?> tag identifies the XML version supported within the file 108.

The <CADManagerDictionary> tag comprise a root tag that encloses all the parser logic (in conjunction with its complementary and paired </CADManagerDictionary> tag). This tag can contain version and date information for maintenance purposes.

The <SupportedProducts> node is used to organize the supported products into product families. The <View> node is used to specify how the supported products and their product families are displayed in the user interface of the Product Manager 106.

The <ParserLogic> node encloses the parser logic for discovery and data extraction from the registry. The following tags are subordinate nodes within the <ParserLogic> node.

A<NavigateKey> node provide a conditional check command that evaluates to "true" if a given registry entry is present, and otherwise "false". If the registry entry is present, then further evaluation of this tag's child nodes or tags will be evaluated.

Within one or more <NavigateKey> nodes, a <KeyMaskIterate> node provides a pattern matching with iteration command. A pattern mask is specified and a complete evaluation of the child nodes is performed for every pattern match. The wildcards as specified in the mask can act as data variables that can be referenced anywhere inside the <KeyMaskIterate> node.

The <ProductDef> node provides a placeholder for the discovery and extraction of data related to a software product registered in the registry. Every <ProductDef> node contains two child nodes: <Discovery> and <Fields>.

The <Discovery> node can host one or more <Rule> nodes. Each <Rule>node provides the means for evaluating the existence of a given software product. Specific boolean value tag expressions (such as<MatchValue> and <KeyExists>) may be child nodes within the <Rule> node. Each child node of the <Rule> tag is ANDed with the other child nodes, and that value is assigned to the <Rule> node itself.

For a <Discovery> node evaluation, all the evaluated <Rule> child nodes are ORed together (so that if any of the <Rule> nodes evaluate to "true", then the <Discovery> node evaluates to "true" as well). When the <Discovery> node is evaluated as "true", then the software product specified by the <ProductDef> has been successfully found.

Data extraction for the software product is provided by the <Fields> node. Every <Field> node within the <Fields> node specifies a given software product property (specified by the "Name" attribute of the given <Field> node). The actual value of a software product property is the value of the corresponding <Field> node and can be provided by literal string values by any tag that resolves to a string value (such as <GetValue> or <SwitchAlias> discussed below).

The <Switchlias> and <Case> tags provide the equivalent of a "switch . . . case" statement of the "C" programming language. These tags are used to evaluate a variable (known as an "Alias"), and branches to the appropriate <Case> child node corresponding to that value. The whole expression evaluates to a literal string value of the resolved <Case> node.

These XML tags and their semantics are further illustrated by the exemplary XML parser file 108 contained in the Table below:

```xml
<?xml version="1.0"?>
<CADManagerDictionary version="x.x.x.x" date="mmddyyy">
    <SupportedProducts>
        <View>
            <Product Family="AutoCAD" Name="AutoCAD 2002"/>
            <Product Family="AutoCAD" Name="AutoCAD R14.0"/>
        </View>
    </SupportedProducts>
    <ParserLogic>
        <NavigateKey Key="HKEY_LOCAL_MACHINE/SOFTWARE">
            <NavigateKey Key="Autodesk">
                <NavigateKey Key="AutoCAD">
                    <!-- ALL PRODUCTS UNDER R15.0 KEY -->
                    <NavigateKey Key="R15.0">
                        <KeyMaskIterate Mask="ACAD-%A:%B">
                            <!-- AutoCAD 2000i -->
                            <ProductDef Name="AutoCAD 2000i">
                                <Discovery>
                                    <Rule>
                                        <MatchValue Value="ProductName" Data="AutoCAD 2000i"/>
                                    </Rule>
                                </Discovery>
                                <Fields>
                                    <Field Name="ProductName">
                                        <GetValue Entry="ProductName"/>
                                    </Field>
                                    <Field Name="Version">
                                        <GetValue Entry="Release"/>
                                    </Field>
                                            . . .
                                    <Field Name="SPName">
                                        <SwitchAlias Alias = "%b">
                                            <Case Data="409">
                                                <MatchOneofSubKeys Key = ".SOFTWARE\CLASSES\Installer\Patches">
                                                    <Match Data="A ...">
                                                        AutoCAD 2000i SP3 (Live Update 2) -- U181p -- swlock</Match>
                                                    <Match Data="B ...">
                                                        AutoCAD 2000i SP3 (Live Update 2) -- U181p -- unlock</Match>
                                                    <Match Data="C ...">
                                                        AutoCAD 2000i SP2 (Live Update 1) -- U120p -- swlock</Match>
                                                    <Match Data="D ...">
                                                        AutoCAD 2000i SP2 (Live Update 1) -- U120p -- unlock</Match>
                                                    <Match Data="E ...">
                                                        AutoCAD 2000i SP1 (Released only to A/P) -- u100 -- unlock</Match>
                                                </MatchOneofSubKeys>
                                            </Case>
                                        </SwitchAlias>
                                    </Field>
                                </Fields>
                            </ProductDef>
                            <!-- Extensions for AutoCAD 2000i -->
                            <ProductDef Name="AutoCAD 2000i Extensions">
                                <Discovery>
                                    <Rule>
                                        <MatchValue Value="ProductName" Data="AutoCAD 2000i"/>
                                        <KeyExists Key="Applications/AcadStandards"/>
                                    </Rule>
                                </Discovery>
                                <Fields>
                                    <Field Name="ProductName">CAD Standards extension for AutoCAD 2000i</Field>
                                </Fields>
                            </ProductDef>
                        </KeyMaskIterate>
                    </NavigateKey>
                </NavigateKey>
            </NavigateKey>
        </NavigateKey>
    </ParserLogic>
</CADManagerDictionary>
```

In the above example, the "AutoCAD" product family includes the "AutoCAD 2002" and "AutoCAD R14.0" software products.

In the above example, the XML parser function of the Product Manager 106 navigates through the registry of each computer looking for the Key "HKEY_LOCAL_MACHINE/SOFTWARE", and the subordinate Key "Autodesk", and the next subordinate Key "AutoCAD", and the next subordinate Key "R15.0".

A pattern matching with iteration is then performed on the child nodes of the registry to find any that include the pattern "ACAD-%A:%B" wherein %A:%B is a wild card pattern.

Placeholders are provided for the discovery and extraction of data related to the "AutoCAD 2000i" software product. A Discovery Rule is provided that includes a boolean value expression where for Value="ProductName" and Data="AutoCAD 2000i". Once found, data extraction is performed for the Fields "ProductName" and "Version", among others. Data extraction is also performed for the Field "SPName", and depending on the binary value of the extracted data, a pre-defined value is stored in the Field, indicating a particular service pack.

Placeholders are also provided for the discovery and data extraction of the "AutoCAD 2000i Extensions" software product. A Discovery Rule is provided that includes a boolean value expression where for Value="ProductName" and Data="AutoCAD 2000i" and the Key "Applications/AcadStandards". Once found, data extraction is performed for the Field "ProductName".

Logic of the Product Manager

Figure 4:
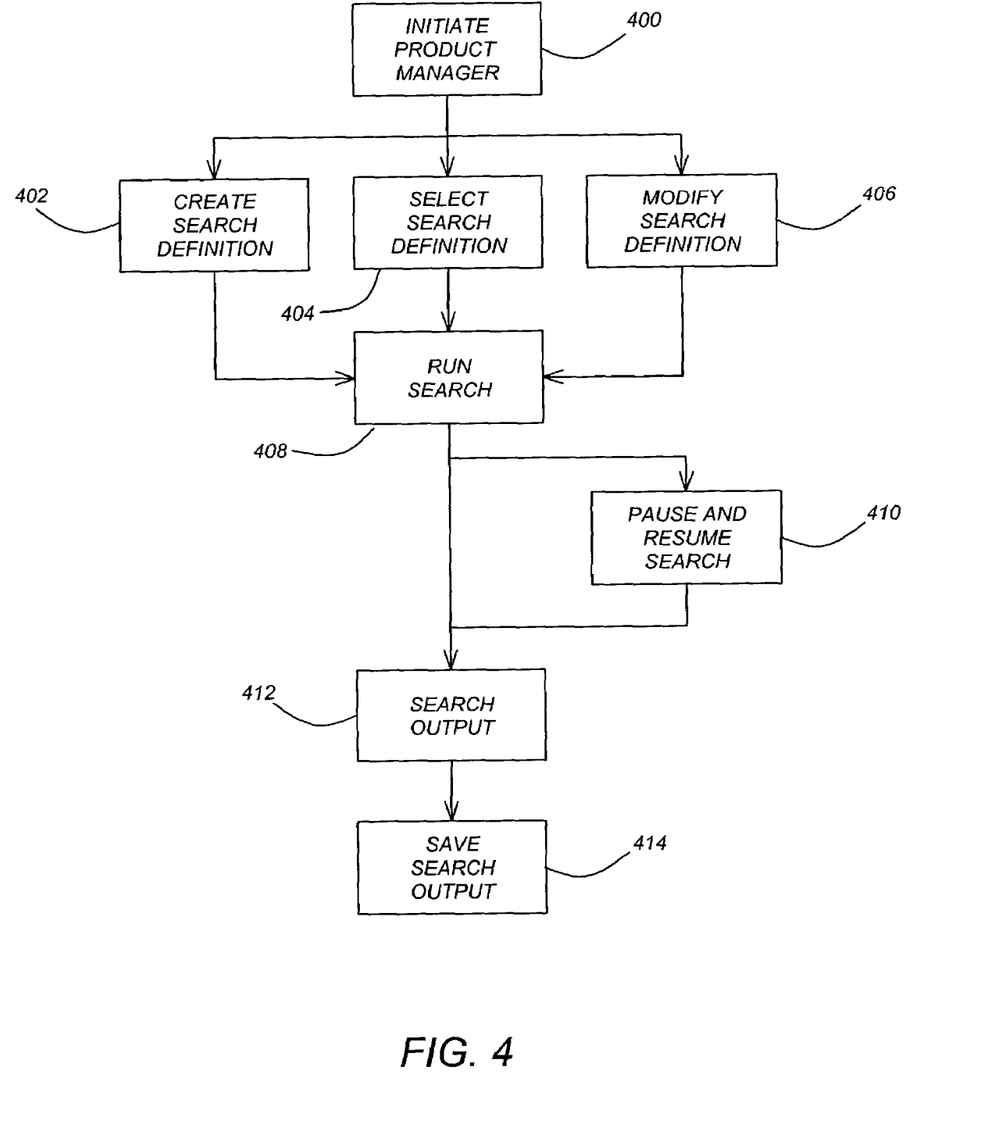
FIG. 4 is a workflow diagram illustrating the operation of the Product Manager according to the preferred embodiment of the present invention.

FIG. 4 is a workflow diagram illustrating the operation of the Product Manager 106 according to the preferred embodiment of the present invention.

Block 400 represents the Product Manager 106 being initiated.

Block 402, 404 and 406 represent the Product Manager 106 being used by the system manager to either create a new search definition (402), select an existing search definition (404), or modify an existing search definition (406).

Block 408 represents the Product Manager 106 performing the search of the specified network domains and individual computers using the XML parser file 108 to extract data on the specified software products from the registries of the specified network domains and individual computers.

Block 410 represents the Product Manager 106 (optionally) pausing the search being performed of the specified network domains and individual computers. Searches can be resumed from this Block as well.

Block 412 represents the Product Manager 106 outputting the search results.

Block 414 represents the Product Manager 106 saving the search results in the inventory file 110.

Figure 5:
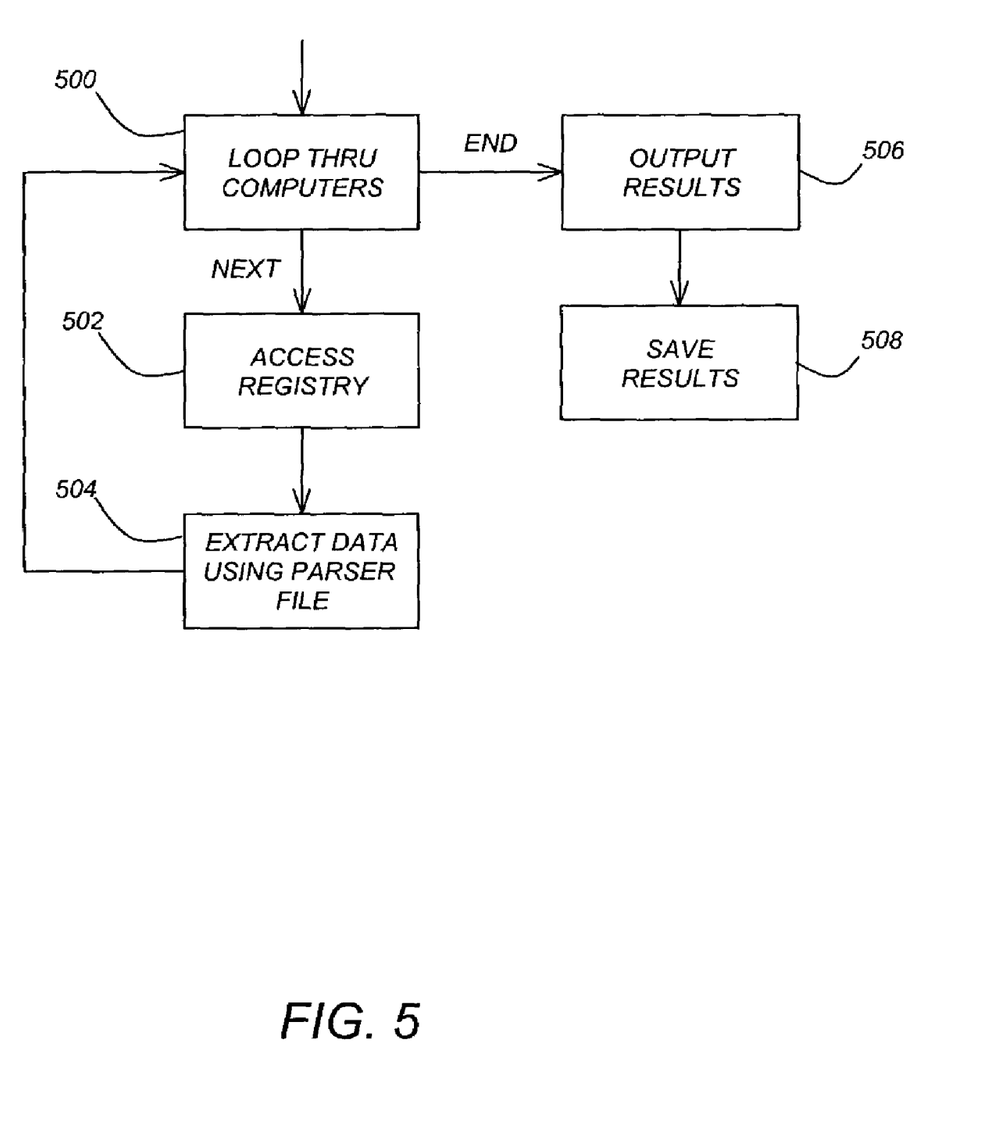
FIG. 5 is a flowchart that further illustrates the functions performed by the Product Manager at Block 408 in FIG. 4 according to the preferred embodiment of the present invention.

FIG. 5 is a flowchart that further illustrates the functions performed by the Product Manager 106 at Block 408 in FIG. 4 according to the preferred embodiment of the present invention.

Block 500 represents the Product Manager 106 looping through all of the computers to be searched.

Block 502 represents the Product Manager 106 accessing the registry on the current computer being searched.

Block 504 represents the Product Manager 106 extracting data for the specified software products from the registry using the XML parser file 108. Generally, this Block entails performing a parser function that acts as an interpreter and uses logic specified by the XML parser file 108 to parse patterns and structures in the registries of the specified computers.

Moreover, the logic specified by the XML parser file 108 includes a set of scripting directives organized in a hierarchical manner, wherein the scripting directives are evaluated for each of the registries of the specified computers. Further, the scripting directives comprise one or more directives selected from a group comprising: a node used to organize the software products into product families, a node that encloses the logic, a node that provides a conditional check command, a node that provides a pattern matching with iteration command, a node that provides for evaluating an existence of one of the software products, a node that provides for data extraction of the specified software product from a registry, and a node that provides for evaluating a variable and for branching to an appropriate child node corresponding to a value for the variable.

Generally, the extracted data comprises one or more elements selected from a group comprising: a name of the computer, a name of the software product found on a particular computer, a version of the software product, a location of the software product, a serial number of the software product, and a user name associated with the software product.

Also, note that the Product Manager 106 may utilize multiple execution threads to perform the searches. Specifically, Blocks 502 and 504 may be executed simultaneously for several remote computer registry databases. This is accomplished by running multiple operating system execution threads, each one performing an individual search operation on a given machine (e.g., a "thread pool" operating on a "shared queue" of the targeted machines may be utilized).

Block 506 represents the Product Manager 106 compiling a report listing of the software products installed on the specified computers and outputting the report.

Block 508 represents the Product Manager 106 (optionally) saving the report listing in an inventory database.

Conclusion

This concludes the description of the preferred embodiment of the invention. The following describes some alternative embodiments for accomplishing the present invention.

For example, any type of computer, such as a mainframe, minicomputer, work station or personal computer, or network could be used with the present invention. In addition, any software program, application or operating system could benefit from the present invention. It should also be noted that the specific software products, scripting directives and extracted data described herein are not intended to limit the invention, but merely to provide examples.

In summary, the present invention discloses a method, apparatus, and article of manufacture for inventorying software products. One or more search definitions are created specifying the software products, as well as one or more network domains and individual computers, to be searched. The search is performed using an XML (eXtensible Markup Language) parser file to extract data on the specified software products from the registries of the specified network domains and individual computers. A report listing of the software products installed on the specified network domains and individual computers is compiled from this data. The report listing can be saved for later use in an inventory database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of inventorying software products, comprising:
    (a) creating, in a Product Manager executed by a workstation, one or more search definitions specifying the software products to search for that are installed on one or more specified computers that are connected to the workstation by a network, wherein the search definitions are used to extract data on the specified software products from registries of the specified computers; and
    (b) performing, in the Product Manager executed by the workstation, a search of the specified computers using a parser file based on the search definitions, wherein the Product Manager remotely accesses the registries of the specified computers across the network and uses the parser file to extract the data on the specified software products that are installed on the specified computers from the registries of the specified computers for subsequent storage and display by the Product Manager on the workstation, wherein the parser file provides a set of scripting directives that define logic, rules, commands and conditional checks used to parse, navigate and evaluate patterns and structures in the registries of the specified computers being searched.

2. The method of claim 1, further comprising compiling a report listing of the software products installed on the specified computers.

3. The method of claim 2, further comprising saving the report listing in an inventory database.

4. The method of claim 1, wherein the data comprises one or more elements selected from a group comprising:
    a name of the computer;
    a name of the software product found on a particular computer;
    a version of the software product;
    a location of the software product;
    a serial number of the software product; and
    a user name associated with the software product.

5. The method of claim 1, wherein the performing step further comprises performing a parser function that acts as an interpreter and uses logic specified by the parser file to parse, navigate and evaluate patterns and structures in the registries of the specified computers.

6. The method of claim 5, wherein the logic specified by the parser file includes a set of scripting directives organized in a hierarchical manner.

7. The method of claim 6, wherein the scripting directives are evaluated for each of the registries of the specified computers.

8. The method of claim 6, wherein the scripting directives comprise one or more directives selected from a group comprising:
    a node used to organize the software products into product families;
    a node that encloses the logic;
    a node that provides a conditional check command;
    a node that provides a pattern matching with iteration command;
    a node that provides for evaluating an existence of one of the software products;
    a node that provides for data extraction of the specified software product from a registry; and
    a node that provides for evaluating a variable and for branching to an appropriate child node corresponding to a value for the variable.

9. An apparatus for inventorying software products, comprising:
    a workstation; and
    a Product Manager, executed by the workstation, for:
        (a) creating one or more search definitions specifying the software products to search for that are installed on one or more specified computers that are connected to the workstation by a network, wherein the search definitions are used to extract data on the specified software products from registries of the specified computers; and
        (b) performing a search of the specified computers using a parser file based on the search definitions, wherein the Product Manager remotely accesses the registries of the specified computers across the network and uses the parser file to extract the data from registries on the specified software products that are installed on the specified computers for subsequent storage and display by the Product Manager on the workstation, wherein the parser file provides a set of scripting directives that define logic, rules, commands and conditional checks used to parse, navigate and evaluate patterns and structures in the registries of the specified computers being searched.

10. The apparatus of claim 9, further comprising logic for compiling a report listing of the software products installed on the specified computers.

11. The apparatus of claim 10, further comprising logic for saving the report listing in an inventory database.

12. The apparatus of claim 9, wherein the data comprises one or more elements selected from a group comprising:
    a name of the computer;
    a name of the software product found on a particular computer;
    a version of the software product;
    a location of the software product;
    a serial number of the software product; and
    a user name associated with the software product.

13. The apparatus of claim 9, wherein the logic for performing further comprises logic for performing a parser function that acts as an interpreter and uses logic specified by the parser file to parse, navigate and evaluate patterns and structures in the registries of the specified computers.

14. The apparatus of claim 13, wherein the logic specified by the parser file includes a set of scripting directives organized in a hierarchical manner.

15. The apparatus of claim 14, wherein the scripting directives are evaluated for each of the registries of the specified computers.

16. The apparatus of claim 14, wherein the scripting directives comprise one or more directives selected from a group comprising:
    a node used to organize the software products into product families;
    a node that encloses the logic;
    a node that provides a conditional check command;
    a node that provides a pattern matching with iteration command;

a node that provides for evaluating an existence of one of the software products;

a node that provides for data extraction of the specified software product from a registry; and a node that provides for evaluating a variable and for branching to an appropriate child node corresponding to a value for the variable.

17. An article of manufacture comprising a computer-readable storage media embodying instructions that, when executed by a computer, cause the computer to perform a method for inventorying software products, the method comprising:

(a) creating, in a Product Manager executed by a workstation, one or more search definitions specifying the software products to search for that are installed on one or more computers to search that are connected to the workstation by a network, wherein the search definitions are used to extract data on the specified software products from registries of the specified computers; and (b) performing, in the Product Manager executed by the workstation, a search of the specified computers using a parser file based on the search definitions, wherein the Product Manager remotely accesses the registries of the specified computers across the network and uses the parser file to extract the data on the specified software products that are installed on the specified computers from the registries of the specified computers for subsequent storage and display by the Product Manager on the workstation, wherein the parser file provides a set of scripting directives that define logic, rules, commands and conditional checks used to parse, navigate and evaluate patterns and structures in the registries of the specified computers being searched.

18. The article of manufacture of claim 17, further comprising compiling a report listing of the software products installed on the specified computers.

19. The article of manufacture of claim 18, further comprising saving the report listing in an inventory database.

20. The article of manufacture of claim 17, wherein the data comprises one or more elements selected from a group comprising:
    a name of the computer;
    a name of the software product found on a particular computer;
    a version of the software product;
    a location of the software product;
    a serial number of the software product; and
    a user name associated with the software product.

21. The article of manufacture of claim 17, wherein the performing step further comprises performing a parser function that acts as an interpreter and uses logic specified by the parser file to parse, navigate and evaluate patterns and structures in the registries of the specified computers.

22. The article of manufacture of claim 21, wherein the logic specified by the parser file includes a set of scripting directives organized in a hierarchical manner.

23. The article of manufacture of claim 22, wherein the scripting directives are evaluated for each of the registries of the specified computers.

24. The article of manufacture of claim 22, wherein the scripting directives comprise one or more directives selected from a group comprising:
    a node used to organize the software products into product families;
    a node that encloses the logic;
    a node that provides a conditional check command;
    a node that provides a pattern matching with iteration command;
    a node that provides for evaluating an existence of one of the software products;
    a node that provides for data extraction of the specified software product from a registry; and
    a node that provides for evaluating a variable and for branching to an appropriate child node corresponding to a value for the variable.

* * * * *

UNITED STATES PATENT AND TRADEMARK OFFICE
CERTIFICATE OF CORRECTION

PATENT NO. : 7,155,714 B2
APPLICATION NO. : 10/171331
DATED : December 26, 2006
INVENTOR(S) : Makris et al.

It is certified that error appears in the above-identified patent and that said Letters Patent is hereby corrected as shown below:

On the Title Page:

Under Item (75) Inventors:, please delete "Ganfsan" and insert --Ganesan--.

Signed and Sealed this

Second Day of November, 2010

David J. Kappos
*Director of the United States Patent and Trademark Office*